(12) United States Patent
Hannington

(10) Patent No.: US 6,869,195 B2
(45) Date of Patent: Mar. 22, 2005

(54) REAR PROJECTION SCREENS AND METHODS OF MAKING THE SAME

(75) Inventor: Michael E. Hannington, Madison, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/799,457

(22) Filed: Mar. 12, 2004

(65) Prior Publication Data

US 2004/0190144 A1 Sep. 30, 2004

Related U.S. Application Data

(60) Provisional application No. 60/454,197, filed on Mar. 12, 2003.

(51) Int. Cl.[7] .............................................. G02B 27/00
(52) U.S. Cl. ...................................... 359/614; 359/452
(58) Field of Search ........................ 359/614, 612–613, 359/452–454, 527–530

(56) References Cited

U.S. PATENT DOCUMENTS

| | | | | |
|---|---|---|---|---|
| 2,378,252 A | * | 6/1945 | Staehle et al. ............... 359/453 |
| 3,552,822 A | | 1/1971 | Altman ........................ 350/126 |
| 3,614,199 A | | 10/1971 | Altman ........................ 350/105 |
| 3,637,285 A | * | 1/1972 | Stewart ....................... 359/538 |
| 3,893,748 A | | 7/1975 | DePalma et al. ............. 350/128 |
| RE28,634 E | | 12/1975 | DePamla ..................... 350/126 |
| 4,076,384 A | | 2/1978 | Deml et al. .................. 350/122 |
| 4,191,451 A | | 3/1980 | Hodges ....................... 350/126 |
| 4,431,266 A | | 2/1984 | Mori et al. ................... 359/456 |
| 4,486,363 A | | 12/1984 | Pricone et al. ............. 264/1.36 |
| 4,490,010 A | | 12/1984 | Honda et al. ................ 350/128 |
| 4,502,755 A | | 3/1985 | Mori et al. ................... 359/456 |
| 4,509,822 A | * | 4/1985 | Clausen et al. .............. 359/456 |
| 4,601,861 A | | 7/1986 | Pricone et al. ............... 264/1.6 |
| 4,924,356 A | * | 5/1990 | French et al. ................. 362/31 |
| 4,927,233 A | | 5/1990 | Nakanishi et al. ........... 350/128 |
| 4,953,948 A | | 9/1990 | Ito et al. ...................... 350/128 |
| 4,993,806 A | | 2/1991 | Clausen et al. .............. 350/128 |
| 5,066,099 A | | 11/1991 | Yoshida et al. .............. 359/457 |
| RE33,795 E | | 1/1992 | Ogino ........................... 353/74 |
| 5,121,252 A | | 6/1992 | Okada et al. ................. 359/455 |
| 5,156,863 A | | 10/1992 | Pricone et al. ............... 452/363 |
| 5,191,472 A | * | 3/1993 | Kurematsu et al. .......... 359/619 |
| 5,196,960 A | | 3/1993 | Matsuzaki et al. ........... 359/453 |
| 5,216,543 A | * | 6/1993 | Calhoun ....................... 359/619 |
| 5,241,416 A | | 8/1993 | Mitsutake et al. ........... 359/456 |
| 5,289,311 A | | 2/1994 | McClelland et al. ......... 359/457 |
| 5,434,706 A | | 7/1995 | Mitani et al. ................. 359/457 |
| 5,485,308 A | | 1/1996 | Hirata et al. ................. 359/457 |
| 5,513,037 A | | 4/1996 | Yoshida et al. .............. 359/457 |
| 5,536,455 A | | 7/1996 | Aoyama et al. .............. 264/1.7 |
| 5,563,738 A | | 10/1996 | Vance .......................... 359/614 |
| 5,611,611 A | | 3/1997 | Ogino et al. ................... 353/74 |
| 5,667,600 A | | 9/1997 | Grensing et al. ............. 148/437 |
| 5,687,024 A | | 11/1997 | Yoshimura et al. .......... 359/455 |
| 5,694,246 A | * | 12/1997 | Aoyama et al. .............. 359/619 |
| 5,706,134 A | | 1/1998 | Konno et al. ................ 359/599 |
| 5,745,288 A | | 4/1998 | Miyata et al. ................ 359/457 |
| 5,751,478 A | | 5/1998 | Yoshimura et al. .......... 359/453 |

(List continued on next page.)

Primary Examiner—Mohammad Sikder
(74) Attorney, Agent, or Firm—Renner, Otto, Boisselle & Sklar, LLP

(57) ABSTRACT

A light transmitting filter including a light absorbing layer and a transparent layer having a microstructured front surface and a microstructured back surface, wherein the front surface is embedded in the light absorbing layer. The microstructures of the front surface provide a path for light transmittance through the light absorbing layer and the microstructures of the back surface focus the transmitted light thorough the path. The light filter can include an optically clear conformable coating covering the microstructured back surface of the transparent layer.

33 Claims, 7 Drawing Sheets

U.S. PATENT DOCUMENTS

| | | | |
|---|---|---|---|
| 5,781,344 A * | 7/1998 | Vance | 359/614 |
| 5,870,224 A | 2/1999 | Saitoh et al. | 359/456 |
| 5,880,887 A | 3/1999 | Goto | 359/626 |
| 5,889,613 A | 3/1999 | Watanabe | 359/456 |
| 5,933,276 A | 8/1999 | Magee | 359/455 |
| 6,002,464 A | 12/1999 | Fujisawa et al. | 349/112 |
| 6,046,847 A | 4/2000 | Takahashi | 359/457 |
| 6,049,423 A | 4/2000 | Okuda | 359/453 |
| 6,076,933 A | 6/2000 | DiLoreto et al. | 359/614 |
| 6,096,159 A | 8/2000 | Ito et al. | 156/344 |
| 6,097,539 A | 8/2000 | Clausen | 359/456 |
| 6,101,031 A | 8/2000 | Yoshimura et al. | 359/456 |
| 6,163,402 A | 12/2000 | Chou et al. | 359/443 |
| 6,169,633 B1 | 1/2001 | Watanabe | 359/626 |
| 6,172,814 B1 | 1/2001 | Watanabe et al. | 359/619 |
| 6,185,038 B1 | 2/2001 | Yamaguchi et al. | 359/457 |
| 6,204,971 B1 | 3/2001 | Morris et al. | 359/619 |
| 6,261,402 B1 | 7/2001 | Watanabe et al. | 156/230 |
| 6,262,840 B1 | 7/2001 | Watanabe et al. | 359/453 |
| 6,271,965 B1 | 8/2001 | Miyata | 359/453 |
| 6,278,546 B1 | 8/2001 | Dubin et al. | 359/452 |
| 6,304,379 B1 | 10/2001 | Kobayashi | 359/457 |
| 6,307,675 B1 | 10/2001 | Abe et al. | 359/456 |
| 6,317,263 B1 | 11/2001 | Moshrefzadeh et al. | 359/443 |
| 6,327,091 B1 | 12/2001 | Agano | 359/619 |
| 6,339,461 B1 | 1/2002 | Kashiwazaki et al. | 349/155 |
| 6,344,263 B1 | 2/2002 | Moshrefzadeh et al. | 428/206 |
| 6,369,944 B1 | 4/2002 | Zeira | 359/452 |
| 6,384,970 B1 | 5/2002 | Abe et al. | 359/455 |
| 6,400,505 B1 | 6/2002 | Funazaki et al. | 359/456 |
| 6,407,859 B1 | 6/2002 | Hennen et al. | 359/454 |
| 6,417,966 B1 | 7/2002 | Moshrefzadeh et al. | 359/453 |
| 6,421,181 B1 | 7/2002 | Yoshida et al. | 359/619 |
| 6,449,089 B1 | 9/2002 | Moshrefzadeh et al. | 359/454 |
| 6,462,870 B2 | 10/2002 | Funazaki et al. | 359/456 |
| 6,466,368 B1 | 10/2002 | Piepel et al. | 359/456 |
| 6,502,942 B2 | 1/2003 | Mori et al. | 353/74 |
| 6,502,943 B2 | 1/2003 | Nakamura et al. | 359/603 |
| 6,515,798 B1 | 2/2003 | Chou et al. | 359/443 |
| 6,519,087 B2 | 2/2003 | Moshrefzadeh | 359/453 |
| 6,535,333 B1 | 3/2003 | Piepel et al. | 359/453 |
| 6,594,079 B1 | 7/2003 | Trott et al. | 359/456 |
| RE38,245 E | 9/2003 | Morris et al. | 359/619 |
| 2001/0001582 A1 | 5/2001 | Walker | 359/443 |
| 2001/0009172 A1 | 7/2001 | Thielman et al. | 156/73.1 |
| 2001/0015846 A1 | 8/2001 | Morris et al. | 359/453 |
| 2001/0050811 A1 | 12/2001 | Miyata | 359/453 |
| 2001/0050812 A1 | 12/2001 | Takahashi et al. | 359/456 |
| 2002/0012165 A1 | 1/2002 | Funazaki et al. | 359/456 |
| 2002/0034618 A1 | 3/2002 | Moshrefzadeh et al. | 428/206 |
| 2002/0044360 A1 | 4/2002 | Yoshida et al. | 359/619 |
| 2002/0080484 A1 | 6/2002 | Moshrefzadeh et al. | 359/460 |
| 2002/0109916 A1 | 8/2002 | Moshrefzadeh | 359/456 |
| 2002/0154401 A1 | 10/2002 | Hennen et al. | 359/454 |
| 2002/0196516 A1 | 12/2002 | Hira | 359/237 |
| 2003/0030903 A1 | 2/2003 | Honda et al. | 359/457 |
| 2003/0102591 A1 | 6/2003 | Thielman et al. | 264/166 |
| 2004/0004770 A1 | 1/2004 | Ebina et al. | 359/648 |

* cited by examiner

REAR PROJECTION SCREENS AND METHODS OF MAKING THE SAME

This application claims the benefit of Provisional Patent Application Ser. No. 60/454,197 dated Mar. 12, 2003.

FIELD OF THE INVENTION

The invention relates to rear projection screens and light filters, specifically those made with microstructures.

BACKGROUND OF THE INVENTION

Rear projection screens transmit an image from the back of the screen to the viewer on the opposite side of the screen. The image is affected by the amount of light transmitted by the screen or filter or throughput. Generally, screens and filters have been limited by their construction to the amount of light transmitted through the screen or filter. It is desirable to have constructions that provide increased light throughput and also provide improved contrast.

With increased definition of the projected image, the number of pixels has increased from the conventional number of several tens of thousands to a number exceeding one million pixels. As a result, there has been a demand for a finer structure of the lenses in the projection screen as well.

In concrete terms, there is a need to reduce the lens structure of current projection screens to a value of 0.36 mm or less in two of three dimensions.

Generally, rear projection screens have suffered from poor angularity. Angularity is the term used to describe the ability of a viewer to see a good image from the screen or filter at a range of angles other than those which are approximately orthogonal to the screen surface. As the viewer moves to the side of the screen or filter, or higher or lower than the screen or filter, the image brightness and/or quality is decreased. The angular brightness can be symmetrical or non-symmetrical and it is desirable to have screens and filters in which the image brightness and/or angular brightness can be tailored to best suit the intended viewing conditions.

It is typically advantageous to control the angular dependence of the screen's luminance by directing light to that region where the viewer is most likely to be positioned. For example, where the rear projection display is a data monitor, the viewer is typically positioned centrally relative to, and within approximately one to three feet from the display. The viewer's eyes may be positioned above a line normal to the center of the screen, but the viewer typically does not view the screen from a distance as much as one or two feet above the screen. Furthermore, for reasons of privacy or security, it may be desirable to reduce the luminance emerging from the screen at an angle or 30° or more relative to a normal to the screen. This reduces the possibility that someone positioned far away from the axis of the screen, and perhaps having no authority to view the contents of the screen, sees the information on the screen.

It is generally desirable to provide a rear projection screen that has high resolution, high contrast and a large gain.

U.S. Pat. No. 4,431,266 (Mori) relates to an optical refractor comprising of a plate of transparent material having a first and second surface. Segment lens elements of the same size are arranged on the first and second surface of the plate and formed integrally with the plate. The segment lens elements on the first surface are positioned in face-to-face relation with the segment lens elements arranged on the second surface.

U.S. Pat. No. 4,490,010 (Honda) relates to a rear projection screen consisting of an array of convex lenses on the front and rear sides of the screen. Projections or raised portions are provided which surround the front convex lenses and are extended forwardly thereof and light masking strips or layers are formed over the projections or raised portions.

U.S. Pat. No. 5,066,099 (Yoshida) relates to a rear projection screen image display device that comprises one or more sheet members through which light is sequentially transmitted from the side of a plane of incidence of the screen, the last sheet member comprising a transparent material as a base thereof, and a light diffusing layer provided on the side of a plane of emergence of the base. The light diffuser itself may be colored in order to obtain further enhanced contrast.

U.S. Pat. No. 5,870,224 (Saitoh) relates to lenticular sheet in which cylindrical lens parts including a radiation curable resin are formed on one side of a transparent support, and at least a light-diffusing layer and light-blocking stripes are formed on the flat surface located on the opposite side of said sheet. Cylindrical lens parts with a fine pitch of 0.3 mm or less can be obtained.

U.S. Pat. No. 5,933,276 (Magee) relates to a partially transparent, directional viewing sheet formed of plastic material with convex and concave lenses of elliptical cross-section formed on the front and back surfaces of the sheet.

U.S. Pat. Nos. 5,563,738 and 5,781,344, (Vance), relate to light transmitting and dispersing filters having low reflectance. The multi-layer light filters use the addition of optical layers to a basic refractive light filter to allow adjustment of gain, contrast and ambient light rejection of light filters.

U.S. Pat. No. 6,076,933 (DiLoreto et al.) describes light transmitting and dispersing filters similar to those described by Vance with the addition of a conformal layer of light transmissive material on the back surface of the transparent beads.

SUMMARY OF THE INVENTION

This invention relates to a light transmitting filter comprising: (a) a layer of light absorbing material, the layer having a front surface and a back surface, and (b) a transparent layer having a microstructured first surface and a microstructured second surface, wherein the microstructures of the first surface are embedded in the light absorbing layer and have an exposed surface providing paths for transmitting light through the light absorbing layer and forming interstitial regions between the microstructures substantially filled with the light absorbing material, and wherein the microstructures of the second surface are optically aligned with the microstructures of the first surface to control light transmitted through the path.

In one embodiment of the invention, the light transmitting filter includes an optically clear conformable coating covering the microstructured second surface of the transparent layer to increase the transmittance of the light filter and/or modify the distribution of light through the light filter. The light transmitting filter may also include a clear support layer adhered to the front surface of the light absorbing layer.

The light transmitting filters of the present invention have improved light throughput and improved angularity. The angular brightness can be symmetrical or non-symmetrical and it is desirable to have screens and filters in which the image brightness and/or angular brightness can be tailored to best suit the intended viewing conditions.

The invention further relates to a method of making a light transmitting filter comprising the steps of: (1) providing a transparent film having a first microstructured surface and second microstructured surface wherein the microstructures of the first surface form interstitial regions between the microstructures and wherein the microstructures of the first surface are optically aligned with the microstructures of the second surface; (2) providing a layer of light absorbing material having a first and a second surface; and (3) embedding the microstructures of the first surface of the transparent film into the light absorbing material to a depth sufficient to form light passages through the light absorbing layer, wherein the interstitial regions between the microstructures are substantially filled with light absorbing material.

In another aspect, the invention relates to a method of making a light transmitting filter comprising the steps of: (1) providing a first transparent film having a first and second surface and microstructures on its first surface; (2) providing a second transparent film having a microstructured first surface and a second surface; (3) providing a layer of light absorbing material having a first and second surface; (4) embedding the microstructures of the first surface of the first transparent film into the light absorbing layer to a depth sufficient to form light passages through the light absorbing layer; and (5) laminating the second surface of the first transparent film to the second surface of the second transparent film so that the microstructures of the first transparent film are optically aligned with the microstructures of the second transparent film.

Figure 1:
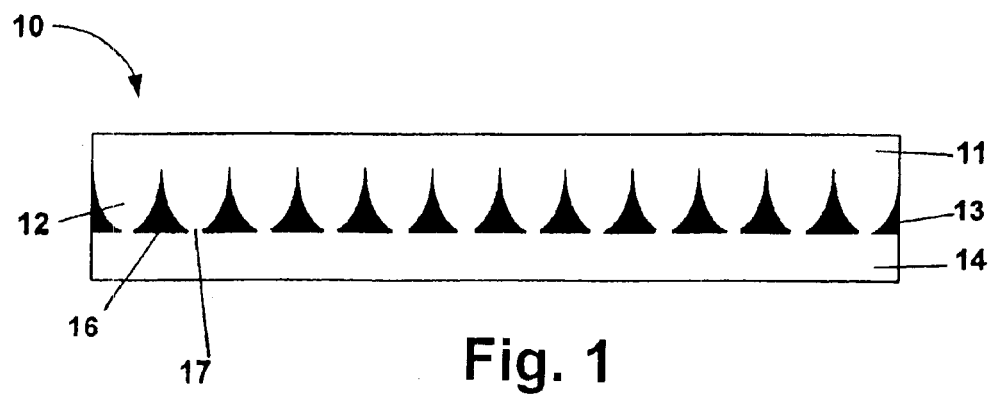
FIG. 1 is a cross sectional view of an intermediate of the light transmitting filter of the invention illustrating the first microstructured surface in contact with a clear support layer.

It should be appreciated that the process steps and structures described below do not form a complete process flow for manufacturing a complete light transmitting filter. The present invention can be practiced in conjunction with fabrication techniques currently used in the art, and only so much of the commonly practiced process steps are included as are necessary for an understanding of the present invention.

DETAILED DESCRIPTION OF THE PREFERRED EMBODIMENTS

In the specification and claims the term "microstructure" relates to microstructures on a polymeric film. As used herein, the term "microstructure" means the configuration of features wherein at least 2 dimensions of the features are microscopic. The topical and/or cross-sectional view of the features must be microscopic. The function of the light transmitting filter is dependent on the form of the microstructure, which may consist of positive and negative features.

As used herein, the term "microscopic" refers to features of small enough dimension to require an optic aid to the naked eye when viewed from any plane of view to determine its shape. One criterion is found in Modem Optic Engineering by W. J. Smith, McGraw-Hill, 1966, pages 104–105 whereby visual acuity," . . . is defined and measured in terms of the angular size of the smallest character that can be recognized." Normal visual acuity is considered to be when the smallest recognizable letter subtends an angular height of 5 minutes of arc on the retina. At typical working distance of 250 mm (10 inches), this yields a lateral dimension of 0.36 mm (0.0145 inch) for this object.

The microstructures comprise a series of features having height, length and width. In one embodiment, the microstructures independently have a height and width dimension from about 2.5 to about 360, or from about 10 to about 300, or from about 15 to about 500, or from about 20 to about 250, or from about 25 to about 200, or from about 25 to about 125 microns. In one embodiment, the microstructures have an average height of from about 15 to about 35 microns and are about 50 to about 360 microns in width. The height is measured from the apex of the microstructure to the deepest recess of the microstructure.

The microstructures may be made by many different methods known to those of skill in the art. Particularly useful methods of forming the microstructures are described in detail in U.S. Pat. Nos. 4,486,363, 4,601,861 5,156,863 and patent applications Pub. Nos. U.S. 2003/0102591 and U.S. 2001/0009172, the disclosures of which are hereby incorporated by reference. Another method that may be utilized is the cast and cure method wherein a polymerizable composition is applied between a substrate and a molding tool having formations thereon that are the inverse of microstructures. The composition is polymerized under UV radiation, and then separated from the tool.

As described above, the light transmitting filter comprises: (a) a layer of light absorbing material, the layer having a front surface and a back surface, and (b) a transparent layer having a microstructured first surface and a microstructured second surface, wherein the microstructures of the first surface are embedded in the light absorbing layer and have an exposed surface providing paths for transmitting light through the light absorbing layer and forming interstitial regions between the microstructures substantially filled with the light absorbing material, and wherein the microstructures of the second surface are optically aligned with the microstructures of the first surface to control light transmitted through the path. As used herein, "optically aligned" means that light striking the microstructured second (e.g., back) surface of the transparent layer is focused within the path through the light absorbing layer provided by the microstructures of the first surface of the transparent layer.

The light absorbing layer serves a number of purposes including reducing the reflectivity of the light filter, reducing the amount of light transmitted from the back surface through the interstitial regions between the microstructures in the filter to the viewer and enhancing the contrast of the filter. This layer generally has a thickness sufficient for embedding the microstructures of the first surface of the transparent layer. The embedding of the microstructures is such that the microstructures have an exposed surface that forms light tunnels through the light absorbing layer. The interstitial regions between the individual microstructures are substantially filled, or fully filled with the light absorbing material. As used herein, the term "substantially" means that the majority, i.e., greater than 50%, of the area of the interstitial region is filled. In one embodiment, the area is filled to at least 60%, or at least 75%, or at least 90% of the total area. The microstructures may protrude from the light absorbing layer to provide a path for light transmittance through the light absorbing layer.

The light absorbing layer may be any material that is substantially opaque and can be embedded with the transparent microstructures of the first surface of the transparent layer to form light tunnels through the opaque layer. The light absorbing layer may be any material that is malleable enough to yield when the transparent microstructures are pushed against it, such as a partially or incompletely crosslinked urethane, a pressure sensitive adhesive, or with the addition of heat, thermoplastic polymers. The light absorbing material may also be a material that can form around the microstructures, such as an asphalt or adhesive (a pigmented pressure sensitive adhesive).

Typically, the light absorbing layer comprises a combination of one or more pigments, usually carbon black, or other colorant, and one or more polymers, such as polyolefins, polyacrylates, polyvinyl acetals such as polyvinyl butyral, (e.g., Butvar resins available from Solutia), polyurethanes, polyesters or polyvinylcarboxylates. The polyolefins may be homopolymers and copolymers of $C_{2-12}$ olefins, such as ethylene, propylene, and butylene. The polyacrylates, including polymethacrylates, may be homopolymers or copolymer of $C_{1-12}$ acrylate or methacrylate monomers, such as methyl, ethyl, propyl, butyl, hexyl, or octyl acrylates or methacrylates. Here and elsewhere in the specification and claims, the term for pendant groups is meant to include all isomeric forms of the group. For instance, the use of the term octyl is intended to cover n-octyl, isooctyl, and 2-ethylhexyl groups. The polyvinylcarboxylates include homo or copolymers of $C_{1-12}$ vinyl carboxylates, such as vinyl acetate, vinyl propionate and vinyl butyrate. Examples of useful commercially available polyacrylates include Acrylic HI-7 from ICI and Acrylic MI-7 from Rohm & Haas. The light absorbing layer may contain from about 2% to about 10% by weight of the pigment and/or colorant.

Alternatively, the light absorbing layer may be a photosensitive film, in which case its optical density can be varied by exposure to actinic light. Photochromic materials which automatically adjust their absorption in response to ambient light conditions also can be used. In addition to film and polymer type materials, the light absorbing layer may be a wire mesh or perforated metal or polymer sheet, or a combination of wire mesh and polymers.

In one embodiment, the front surface of the light absorbing layer may be supported by an optically clear support layer to improve the sturdiness of the filter. The optically clear support layer may be a glass or a polymer. The support layer must resist the pressure exerted by the transparent microstructured layer during the embedding process. The support layer may be adhered to the light absorbing layer by an adhesive, by lamination, or as a result of coextrusion. The support layer may be any material having sufficient strength to provide support polyolefins, such as optically clear polyolefins from metallocene catalysts, polyacrylates, polymethacrylates, polycarbonates, polyurethanes, polyesters, such as polyethylene terephthates, polyvinylidene dichloride, cellophane, cellulose acetate, polyvinylidene difluorides, polyvinyl chlorides, polyvinyl acetals, and polyvinylcarboxylates to the light absorbing layer and having optically clear characteristics. Examples of support layers include glass, polyacrylics, polycarbonates, polyurethanes, such as two part polyurethanes, and polyesters, such as polyethylene terephthalates.

In one embodiment, at least one of the major surfaces of the support layer is textured or randomly matte to optically scatter the light that emerges from the support layer. For example, the surface of the support layer in contact with the light absorbing layer is textured. Alternatively, the outer surface of the support layer can be textured.

As described above, the light transmitting filters include a transparent layer with microstructures on its first surface and its second surface. The microstructures of the first surface may be formed separately from the microstructures of the second surface of the transparent layer. Alternatively, the microstructures of the first and second surfaces may be formed simultaneously.

The transparent layer typically has a thickness from about 10 to about 500, or from about 15 to about 375, or from about 25 to about 250 microns. The thickness is measured to the highest point or apex of microstructures of the first surface to the highest point or apex of the microstructures of the second surface.

The transparent layer is typically composed of any optically clear polymer that is able to form microstructures. The optically clear polymers include those polymers described above for the light absorbing layer. In one embodiment, the transparent layer is formed from polyolefins, such as optically clear polyolefins from metallocene catalysts, polyacrylates, polymethacrylates, polycarbonates, polyurethanes, polyesters, such as polyethylene terephthates, polyvinylidene dichloride, cellophane, cellulose acetate, polyvinylidene difluorides, polyvinyl chlorides, polyvinyl acetals, and polyvinylcarboxylates. In one embodiment, the transparent layer is formed from a polycarbonate, a polymethyl methacrylate, or a urethane.

The microstructures on the first surface are embedded into the light absorbing layer to form passages for light through the light absorbing layer. Any microstructure that provides such passage may be used, provided that the throughput of light is sufficient for rear projection filters and/or screens. The microstructures include cylinders, cones, pyramids, rectangles, hemispheres, squares, hexagon, ridges, and or combinations of two or more thereof. The cones and pyramids may be truncated. In one embodiment, the microstructures are used with their narrowest area extending outward from the surface of the transparent layer to form point or line segment light passages.

It should be understood that cylindrical and rectangular structures may be placed on their long side to form line segment light passages from the longest portion of its dimension extending parallel to the transparent layer. For instance, a microstructure like a pup tent or a quonset hut would form light passages that are line segments. In this embodiment, the length of the microstructure is from about 0.5 to about 50, or from about 1 to about 35, or from about 1.5 to about 10, or from about 2 to about 5 times the width of the microstructure. Here and elsewhere in the specification and claims the range and ratio limits may be combined. When the microstructures produce line segment light passages, then it should be understood that the microstructures may form parallel light passages or may formed light passages that are at other angles such as perpendicular angles making a waffle pattern.

In one embodiment, the microstructures of the transparent layer have a matte or textured finish. The microstructures may also contain particulate matter on the surface of the microstructures. The textured or matte finish helps to reduce speckling.

In one embodiment of the invention, the filter includes an optically clear, substantially uniform conformable layer on the microstructures of the second (e.g., back) surface of the transparent layer. This layer typically has a thickness of about 10% to about 90% of the length of the microstructure, or from about 20% to about 80%, or from about 30% to about 70% of the length of the microstructure. The layer comprises any polymer which has the optical clarity needed for light transmitting filters. Typically these polymers are polyolefins, such as optically clear polyolefins from metallocene catalysts; polyacrylates; polymethacrylates; polycarbonates; polyurethanes; polyesters, such as polyethylene terephthates; polyvinylidene dichloride; cellophane; cellulose acetate; polyvinylidene difluoride; polyvinyl chloride; polyvinyl butyral and polyvinylcarboxylates.

The light filter may have a tie layer to improve the adhesion of the conformable coating to the transparent layer. This can be any material that improves this adhesion. In another embodiment, the transparent layer and the light absorbing layer may be treated to improve adhesion. Examples of suitable tie layer resins include "Platamid", available from Elf Atochem, "CXA", available from DuPont, and "Plexar" available from Chemplex.

In one embodiment, the back surface of the conformed layer of optically clear material has a textured finish that results in reduced speckling. It is believed that the textured finish scatters reflected light with minimal effect on total light transmission thereby reducing speckling. In one embodiment, the textured finish may be a matte finish, or the finish may contain a three-dimensional pattern having cross sections made up of very small circles, ovals, diamonds, squares, rectangles, triangles, polygons, lines, or irregular shapes when the cross section is taken parallel to the surface of the light absorbing material. Several procedures and techniques are known to those skilled in the art for producing textured finishes on surfaces that can be used to form the textured finish on the back surface of the conformed layer. For example, the back surface of a conformable layer of optically clear material may be textured, prior to being conformed to the microstructure, by contact with a film or paper having a textured or matte finish. The finish on the film is replicated on the surface of the conformable layer when the two surfaces are joined by pressure. Alternatively the desired surface of the conformable layer deposited on, e.g., a release liner, can be textured by passing the construction through heated rollers, at least one of which has a textured surface. In another method, the texture can be imparted to the back surface of the conformed layer by first printing a textured surface onto the face of a polymer coated surface of a casting sheet. The printing can be done using common printing techniques such as Flexography (Flexo) and Rotogravure (gravure). Heat and pressure are used to press the texture into the face of the polymer coated casting sheet so that the top of the print is substantially level with the polymer coated surface. The conformable layer is then applied over the textured surface such as by lamination thereby replicating the textured or printed surface on the back surface of the conformable layer.

The light filter may include additional layers light transmissive layers on either its front or back surfaces to further control light through the light filter. Such additional layers include, for example, lenticular lenses, barrel lenses and Fresnel lenses.

The invention may be further understood by reference to the figures. FIG. 1 is a cross sectional view of one embodiment of an intermediate construction of the light filter. Construction 10 has transparent layer 11 having microstructures 12 embedded into light absorbing layer 13. An optically clear support layer 14 is optionally adhered to the front surface of the light absorbing layer 13. Interstitial regions 16 are formed between the individual microstructures and are substantially filled with the light absorbing material. A path 17 for light transmittance through the light absorbing layer 13 is provided by the microstructures 12 of the transparent layer.

Figure 2:
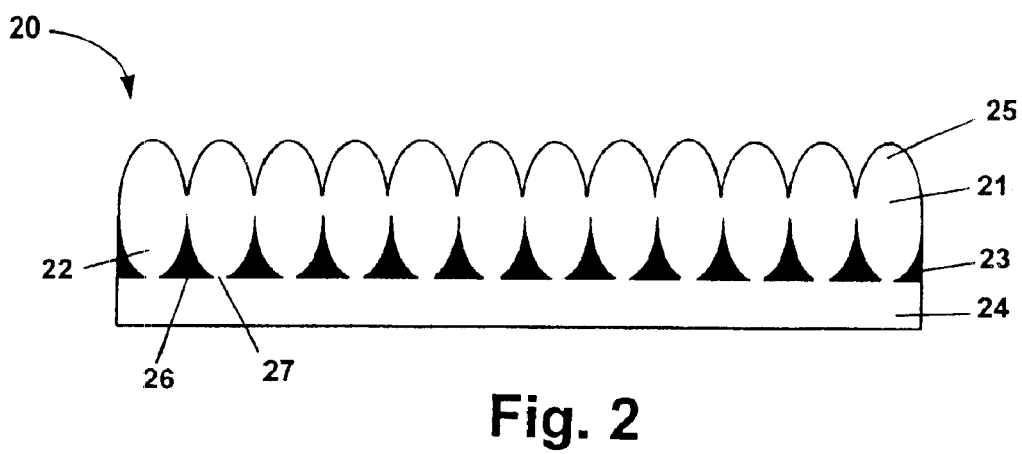
FIG. 2 is a cross sectional view of a light transmitting filter of the invention having a first microstructured surface and second microstructured surface.

FIG. 2 illustrates one embodiment of the light filter of the invention. Light filter 20 has transparent layer 21 having microstructures 22 on its front surface and microstructures 25 on its back surface. The microstructures 22 of the front surface are embedded into light absorbing layer 23. Interstitial regions 26 are formed between the individual microstructures. An optically clear support layer 24 is optionally adhered to the front surface of the light absorbing layer 23. A path 27 for light transmittance through the light absorbing layer 23 is provided by microstructures 22. Microstructures 25 and 22 may be made by simultaneously or sequentially microembossing the transparent layer 21. Alternatively, microstructures 22 can be formed on a first transparent layer and then laminated to a second transparent layer having microstructures 25. The resulting laminate would comprise transparent layer 21. Lamination can occur prior to or subsequent to embedding microstructures 22 in light absorbing layer 23. Microstructures 25 are optically aligned with microstructures 22 to control light transmitted through path 27. Microstructures 25 may have the same or different dimensions as microstructures 22.

Figure 3:
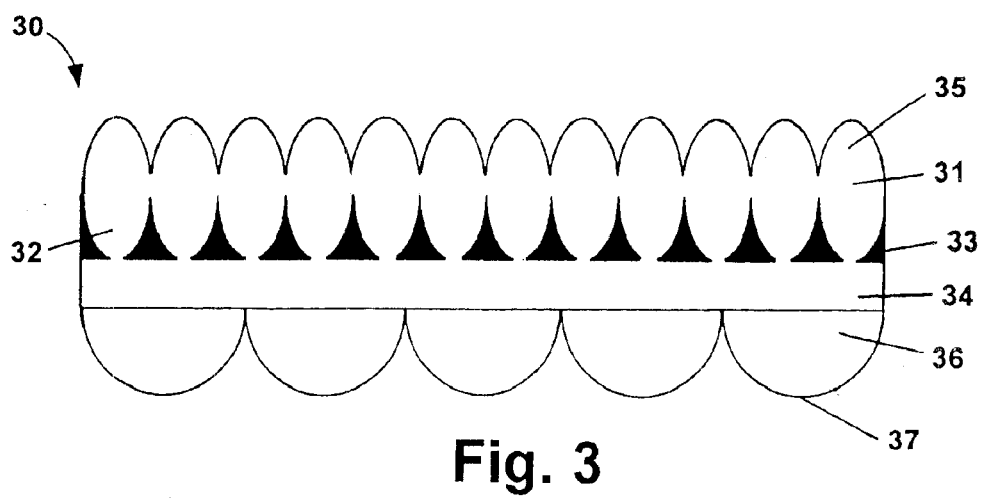
FIG. 3 is a cross sectional view of a light transmitting filter of the invention including lenses on the front surface of the clear support layer.

FIG. 3 shows an embodiment in which the light filter includes additional lenses on its front surface. Light filter 30 has transparent layer 31 having microstructures 32 on its front surface and microstructures 35 on its back surface. The microstructures 32 of the front surface are embedded into light absorbing layer 33. To support layer 34 is adhered columnar lenses 36 with the illustrated circular exterior shape cross section. Other shapes for the cross section are also possible. The columnar lenses layer 36 can be selectively shaped so that its exposed surface 37 is either flatter or more elongated than illustrated. Flatter exposed surface 37, and conversely, more elongated exposed surface 37 tends to disperse light more away from the apexes of the exposed surface 37.

Figure 4:
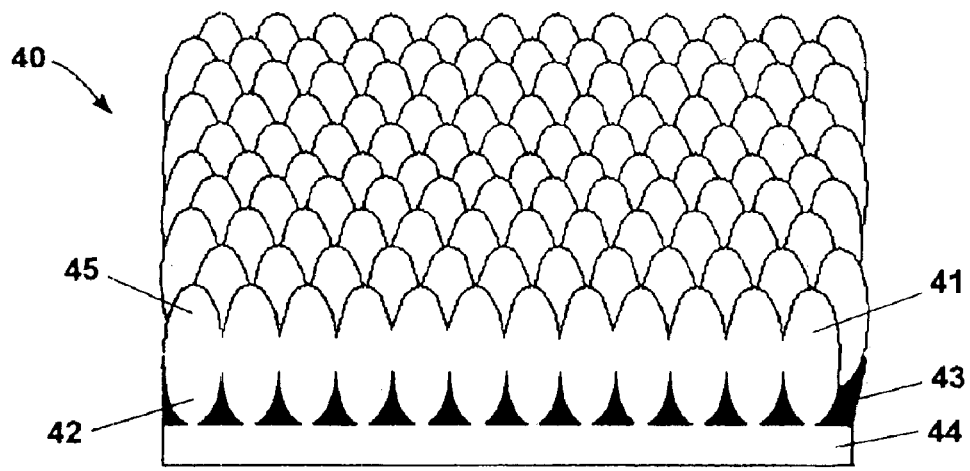
FIG. 4 is a three dimensional view of the light transmitting filter wherein the microstructures of the second surface form lenticular lenses.

FIG. 4 illustrates an embodiment wherein the light filter 40 has transparent layer 41 having microstructures 42 on its front surface and microstructures 45 on its back surface. The microstructures 42 of the front surface are embedded into light absorbing layer 43. An optically clear support layer 44 is optionally adhered to the front surface of the light absorbing layer 43. Microstructures 45 are hemispherically shaped. Microstructures 45 may optionally have a textured finish.

Figure 5:
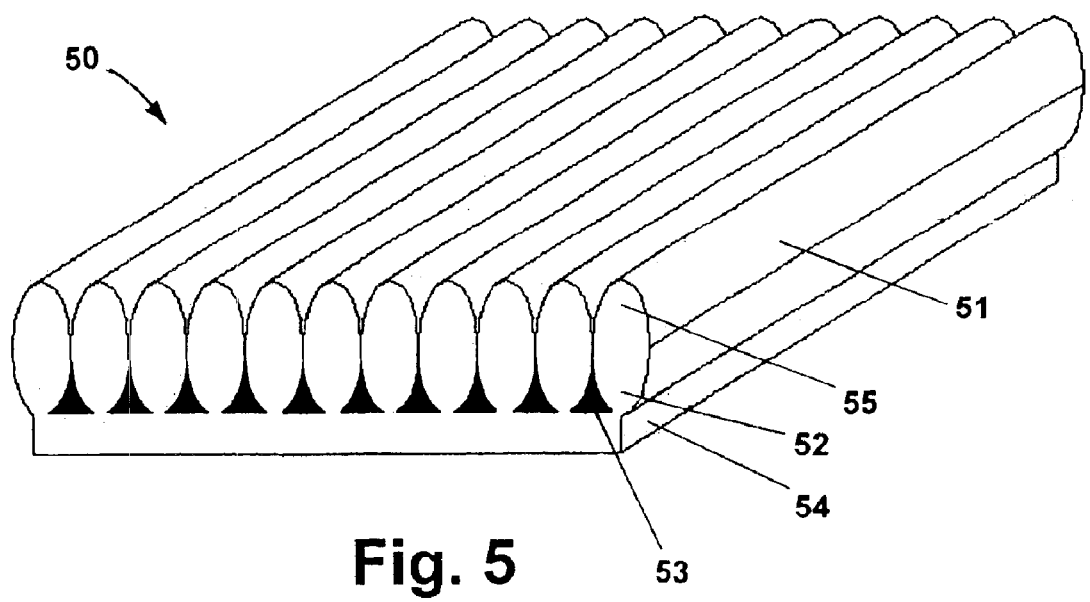
FIG. 5 is a three dimensional view of the light transmitting filter wherein the microstructures of the second surface form barrel lenses.

FIG. 5 illustrates another embodiment wherein the light filter 50 has transparent layer 51 having microstructures 52 on its front surface and microstructures 55 on its back surface. The microstructures 52 of the front surface are embedded into light absorbing layer 53. An optically clear support layer 44 is optionally adhered to the front surface of the light absorbing layer 53. Microstructures 45 are columnar, or "Quonset hut" shaped. Microstructures 55 may optionally have a textured finish.

Figure 6:
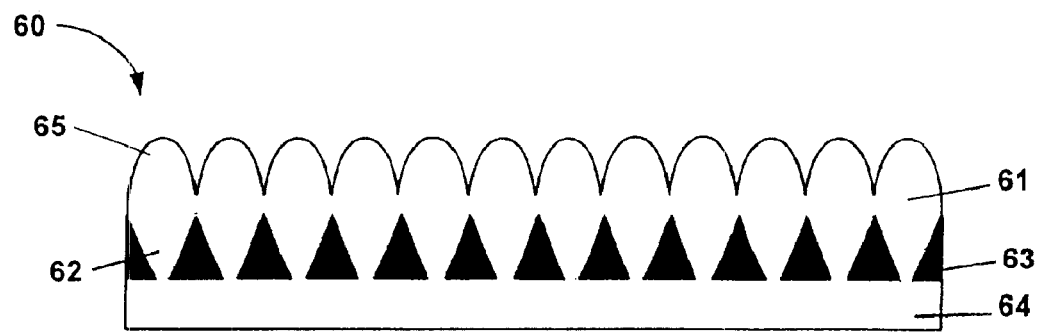
FIG. 6 is a cross sectional view of the light transmitting filter wherein the microstructures of the first surface are conical structures.

FIG. 6 illustrates yet another embodiment wherein the light filter 60 has transparent layer 61 having microstructures 62 on its front surface and microstructures 65 on its back surface. The conical shaped microstructures 62 of the front surface are embedded into light absorbing layer 63. An optically clear support layer 64 is optionally adhered to the front surface of the light absorbing layer 63.

Figure 7:
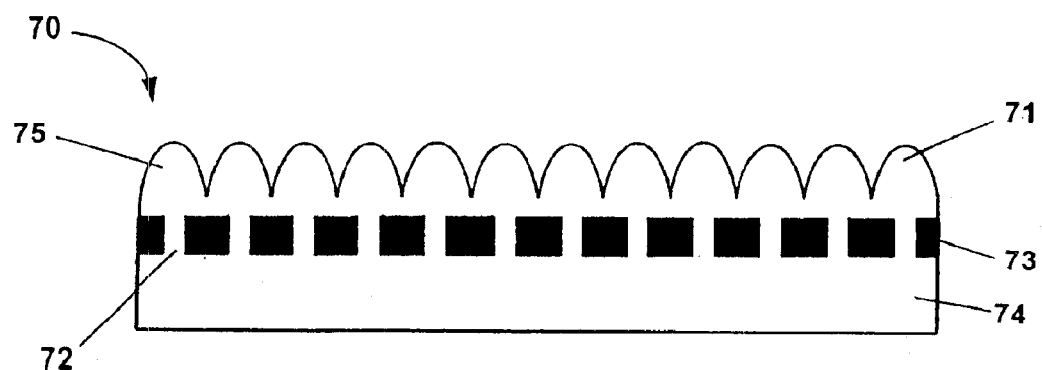
FIG. 7 is a cross sectional view of the light transmitting filter wherein the microstructures of the first surface are cylindrical structures

FIG. 7. Illustrates yet an embodiment wherein the light filter 70 has transparent layer 71 having microstructures 72 on its front surface and microstructures 75 on its back surface. The cylindrical shaped microstructures 72 of the front surface are embedded into light absorbing layer 73. An optically clear support layer 74 is optionally adhered to the front surface of the light absorbing layer 73.

The methods of making the light transmitting filters may be through heat lamination. The microstructures of the transparent layer are pressed into the light absorbing layer with heat and pressure to form light passages. The microstructures extend into and typically through the light absorbing layer. Lamination temperatures and pressures depend on the materials (polymers) used in the various layers, and generally, lamination occurs at a temperature of from about 175° F. (79° C.) to about 400° F. (204° C.), or from about 250° F. (121° C.) to about 350° F. (177° C.). The lamination pressure is typically from about 50 to about 150 psi, or from about 75 to about 125 psi.

In one embodiment, the invention relates to a method of preparing a light transmitting filter comprising the steps of: (1) providing a transparent film having a microstructured first surface and a microstructured second surface, (2) providing a layer of light absorbing material having a first and second surface, (3) embedding the microstructures of the first surface of the transparent film into the light absorbing layer to a depth sufficient to form light passages through the light absorbing layer. In one embodiment, the second surface of the transparent layer may be covered by an additional lens structure, including, or example, a Fresnel lens. In one embodiment, the method includes a further step of adhering an optically clear support layer to the first surface of the light absorbing layer.

In another embodiment, the invention relates to a method of preparing a light transmitting filter comprising the steps of: (1) providing a first transparent film having a first microstructured surface and second surface, (2) providing a second transparent film having a first microstructures surface and second surface, (3) providing a layer of light absorbing material having a first and a second surface, and (4) embedding the microstructures of first surface of the first transparent film into the light absorbing film to a depth sufficient to form light passages through the light absorbing layer, and (5) laminating the second surface of the first transparent layer to the second surface of the second transparent layer so that the microstructures of the first transparent film are optically aligned with the microstructures of the second film. The laminating step may occur prior to or subsequent to the step of embedding the microstructures.

FIGS. 8a–f are cross sectional views of an embodiment of a method of making a light filter. Throughout the drawings, like structures are given the same number. A transparent layer 801 is embossed to form a plurality of microstructures 802. The transparent filter 801 is pressed into a protective support comprising a molding layer 803 and a support layer 804. Molding layer 803 is heat laminated to the transparent layer 801 and the microstructures 802 are embedded into the molding layer 803, this protects the microstructured surface from damage through subsequent processing steps. In one embodiment, it is desirable that the Vicat softening point of the transparent layer 801 is higher than the Vicat softening point of the polymer of the molding layer 803. The molding layer may be any thermoplastic polymer with the appropriate Vicat softening point. If the molding layer is composed of a polymer of similar nature to the transparent layer 801 then a layer of silicone release layer, such as those used for pressure sensitive adhesive liners, may be used to enhance ease of separation of the layers. In one embodiment, the molding layer 803 is composed of polyolefins, such as low, medium and high density polyethylene, propylene or mixtures thereof. The lower Vicat softening point of the molding layers helps protect the microstructures during manufacture of the light filter by softening and/or melting to conform to the surface of the microstructures. Under the pressure and temperature of preparation, the microstructures are pressed into the molding layer.

Figure 8A:
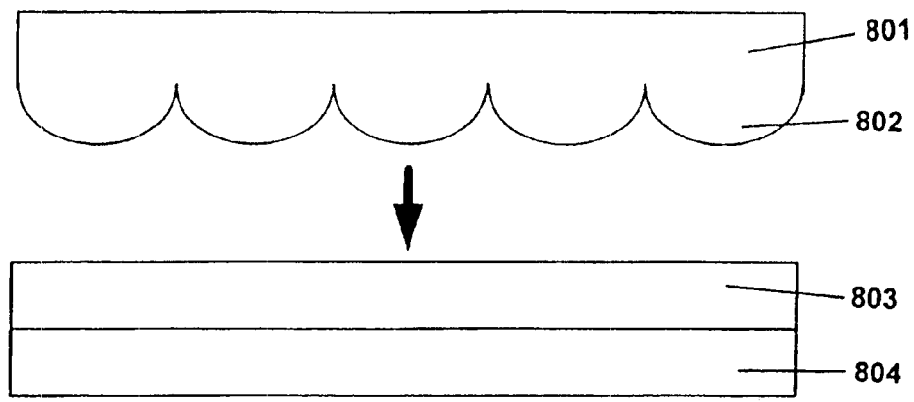
FIGS. 8a–8f are cross sectional views of one embodiment of making the light transmitting filter.
Figure 8B:
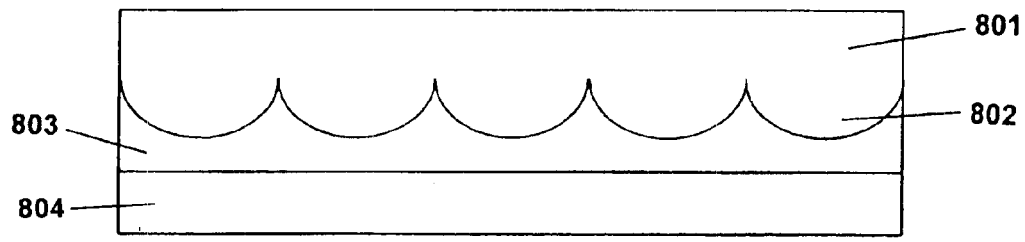
Figure 8C:
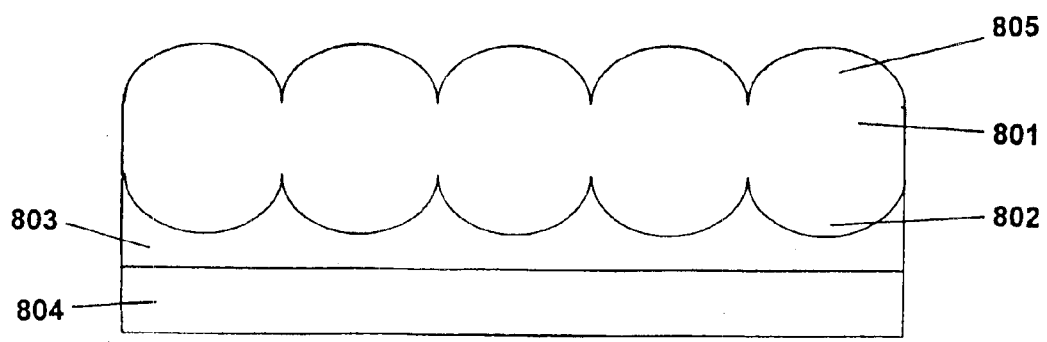
Figure 8D:
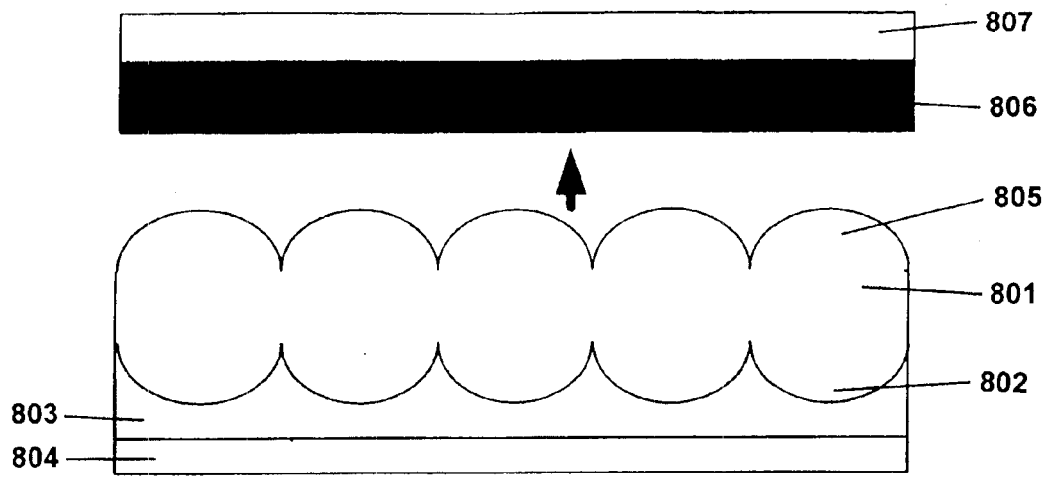
Figure 8E:
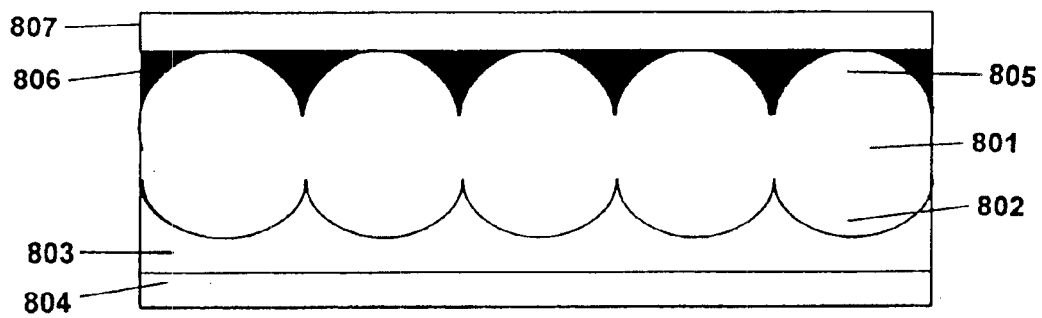
Figure 8F:
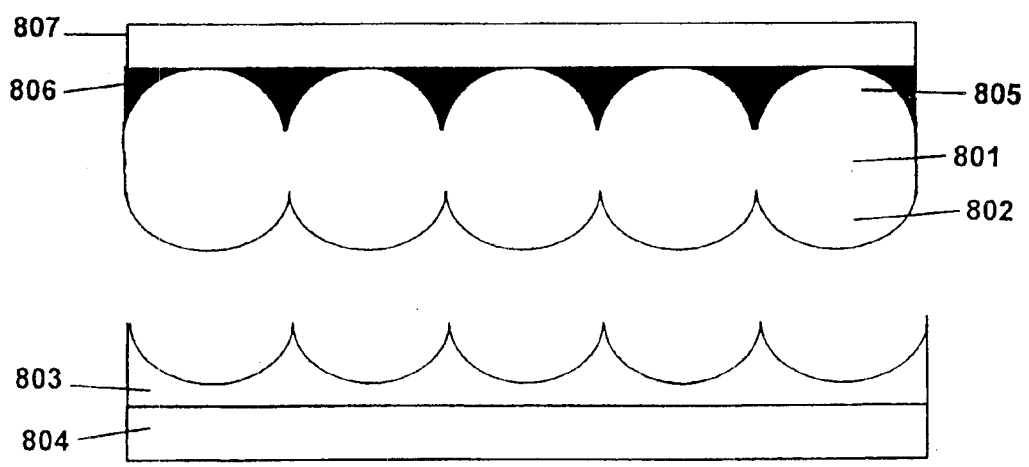

FIG. 8b illustrates that the microstructures 802 of transparent layer 801 are pressed into the molding layer 803. In FIG. 8c, the second surface of the transparent layer 801 is embossed to form a second plurality of microstructures 805. This second plurality of microstructures may be the same or different size as the first plurality of microstructures 802. FIG. 8d illustrates the formation of the light filter from a construction of a light absorbing material 806 on a clear support layer 807. The microstructures 805 are pressed into light absorbing material 806 to form light passages. FIG. 8e illustrates the heat laminated structures having microstructures 805 embedded into the light absorbing material 806 on clear support layer 807. The light transparent layer 801 with microstructures 802 remain laminated to molding layer 803 on support layer 804. FIG. 8f illustrates the final step of making the light filter by removing the molding layer 803 on support 804 to leave the light filter.

FIGS. 9a–f illustrate an embodiment of the invention wherein the light filter includes a conformable coating on the microstructures of the back surface of the transparent layer. A transparent layer 901 is embossed to form a plurality of microstructures 902. The transparent filter 901 is pressed into a protective support comprising molding layer 903 and a support layer 904. Onto molding layer 903 is coated layer 908, which comprises the composition of the conformable coating. Molding layer 903, with conformable coating 908 thereon, is heat laminated to the transparent layer 901 and the microstructures 902 are embedded into the molding layer 903. This protects the microstructured surface from damage throughout subsequent processing steps.

Figure 9A:
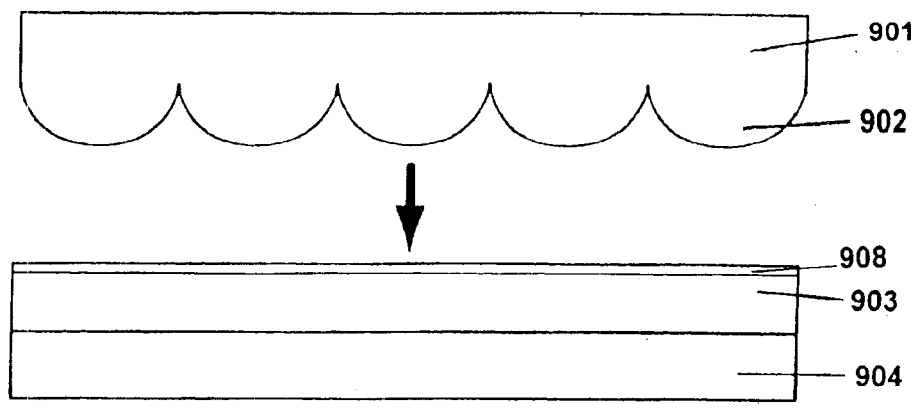
FIGS. 9a–9f are cross sectional views of one embodiment of making the light transmitting filter having an optically clear conformable coating on the second microstructured surface.
Figure 9B:
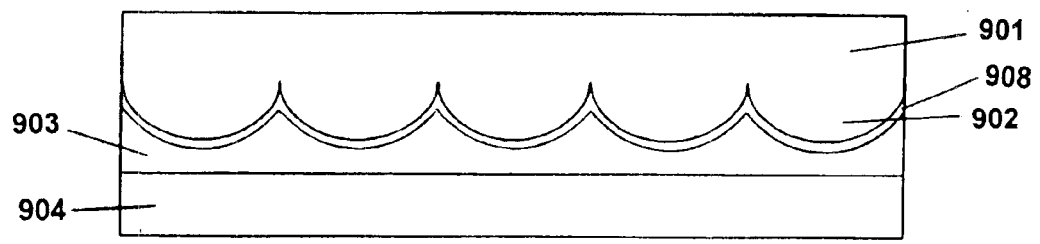
Figure 9C:
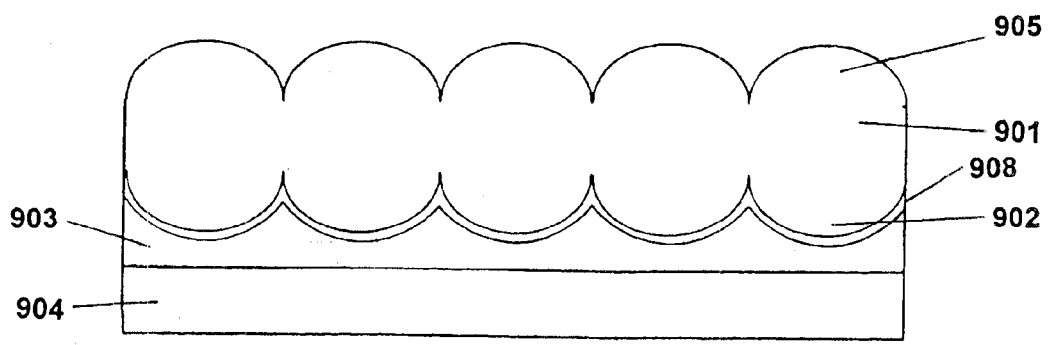
Figure 9D:
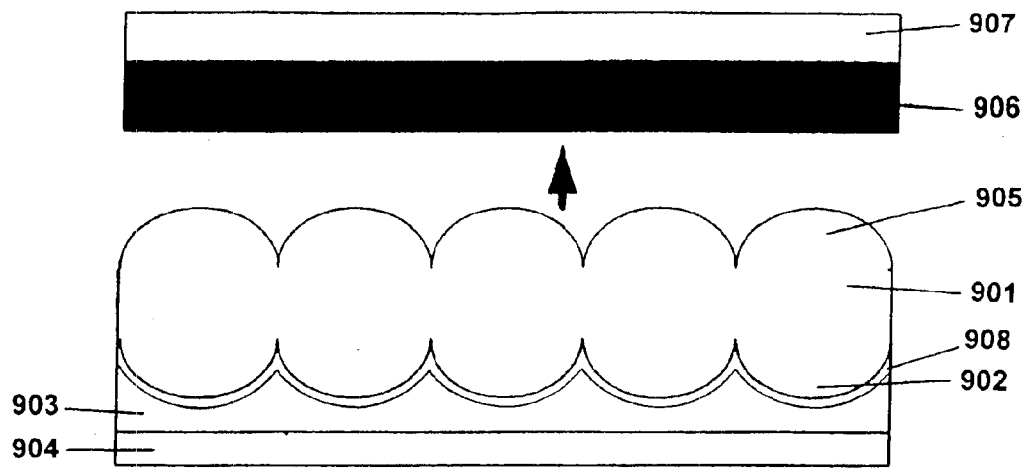
Figure 9E:
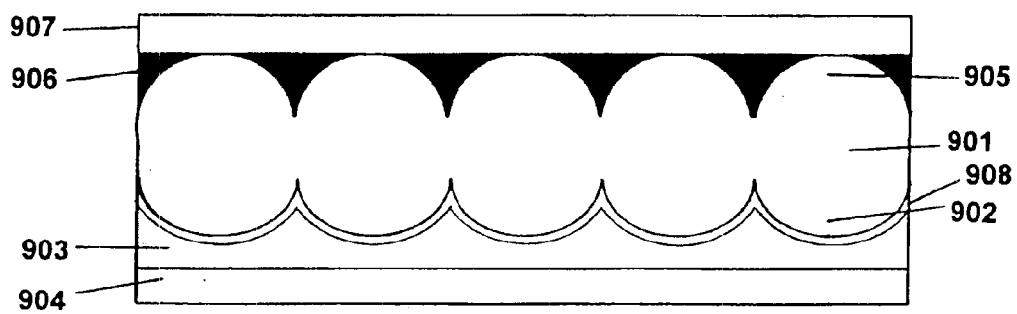
Figure 9F:
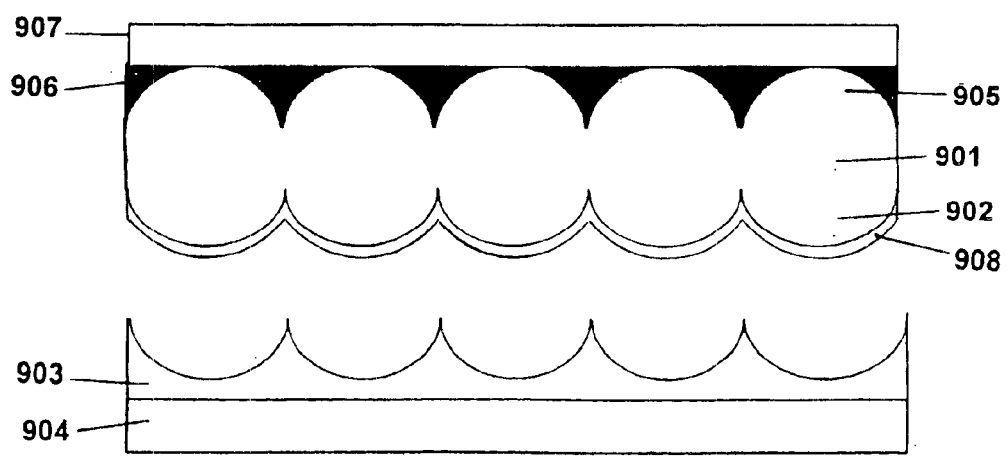

FIG. 9b illustrates that the microstructures 902 of transparent layer 901 are pressed into the molding layer 903. The conformable layer 908 conforms to the shape of the microstructures. In FIG. 9c, the second surface of the transparent layer 901 is embossed to form a second plurality of microstructures 905. This second plurality of microstructures may be the same or different size as the first plurality of microstructures 902. FIG. 9d illustrates the formation of the light filter from a construction of a light absorbing material 906 on a clear support layer 907. The microstructures 905 are pressed into light absorbing material 906 to a depth sufficient to form light passages through light absorbing material 906. FIG. 9e illustrates the heat laminated structures having microstructures 905 embedded into the light absorbing material 906 on clear support layer 907. The light transparent layer 901 with microstructures 902 remain laminated to molding layer 903, with conformable layer 908 adhered to the microstructures 902. In FIG. 9f, support layer 904 and molding layer 903 are removed from the construction. The remaining portion of the construction comprises the light filter.

The following are examples of the preparation of the light filters of the invention. These examples are illustrative and are not to be considered limiting to the scope of the invention. Unless otherwise indicated in the examples and elsewhere in the specification and claims, temperatures are in degrees centigrade, parts and percentages are by weight, and pressure is at or near atmospheric pressure.

EXAMPLE 1

The front side of a transparent layer of impact modified acrylic, such as CP-927 from Ineos Acrylic, is microembossed with heat and pressure to form hemispheres having an approximate diameter of 75 microns. The back side of the transparent layer is simultaneously microembossed with opposing hemispheres of the same diameter except that the hemispheres are elongated. The surface containing the elongated hemispheres is laminated using heat and pressure to a protective substrate consisting of a layer of low density polyethylene coating on polyethylene terephthalate. The front surface is laminated to an opaque layer of thermoplastic urethane S-9815-03 available commercially from Morton International GmbH containing 10% of a finely dispersed carbon black so that the apex of each hemisphere just protrudes through the layer forming light tunnels through the opaque layer. The protective layer is removed and the construction is laminated to a sheet of glass using an optical adhesive so that the elongated hemispheres are exposed.

EXAMPLE 2

The front side of a transparent layer of polycarbonate is microembossed with heat and pressure to form hemispheres with an approximate diameter of 75 microns. The front surface is laminated to an opaque layer of thermoplastic urethane S-9815-03 available commercially from Morton International GmbH containing 10% of a finely dispersed carbon black so that the apex of each hemisphere just protrudes through the opaque layer forming light tunnels through the opaque layer. The construction is laminated to a sheet of glass using an optical adhesive. A separate transparent layer of polymethyl methacrylate having a microembossed surface forming hemispheres is laminated to the back side of the polycarbonate layer with optical adhesive so that the hemispheres of the polymethyl methacrylate layer are exposed.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A light transmitting filter comprising:
   (a) a layer of light absorbing material, the layer having a front surface and a back surface, and
   (b) a transparent layer having a microstructured first surface and a microstructured second surface, wherein the microstructures of the first surface are embedded in the light absorbing layer and have an exposed surface providing paths for transmitting light through the light absorbing layer and forming interstitial regions between the microstructures substantially filled with the light absorbing material, and wherein the microstructures of the second surface are optically aligned with the microstructures of the first surface to control light transmitted through the path.

2. The filter of claim 1 wherein the light absorbing layer comprises a polymeric material and at least one pigment or colorant.

3. The filter of claim 1 wherein the light absorbing layer comprises a polyacrylate, a polyurethane, or a polyvinyl acetal, and at least one pigment or colorant.

4. The filter of claim 1 wherein the transparent layer comprises a polyacrylate, a polycarbonate, a polyurethane or mixtures of two of more thereof.

5. The filter of claim 1 wherein the transparent layer comprises a polyacrylate.

6. The filter of claim 1 wherein the microstructures of the first surface have a height of up to about 250 microns.

7. The filter of claim 1 wherein the microstructures of the first surface have a height of about 25 to about 125 microns.

8. The filter of claim 1 wherein the first surface of the transparent layer is covered with lenticular lenses, barrel lenses, or combinations thereof.

9. The filter of claim 1 wherein the microstructures of the first surface comprise cylinders, truncated cones, pyramids, rectangles, hemispheres, squares, hexagon, ridges, and or combinations of two or more thereof.

10. The filter of claim 1 wherein the second surface of the transparent layer is covered with a Fresnel lens.

11. The filter of claim 1 wherein the transparent layer comprises a multilayered film.

12. The filter of claim 1 wherein the microstructures of the second surface have a height up to about 300 microns.

13. The filter of claim 1 wherein the microstructures of the second surface have the same dimensions as the microstructures of the first surface.

14. The filter of claim 1 wherein the microstructures of the second surface comprise hemispheres.

15. The filter of claim 1 further comprising an optically clear support layer having a front and back surface wherein the back surface is adhered to the front surface of the light absorbing layer.

16. The filter of claim 15 wherein the clear support layer comprises glass, or an optically clear polymeric film.

17. The filter of claim 15 wherein the clear support layer comprises a polyester, polyurethane or a polyacrylate.

18. The filter of claim 15 wherein the front surface of the clear support layer is covered with lenticular lenses, barrel lenses, or combinations thereof.

19. The filter of claim 1 wherein the microstructured second surface has a textured finish.

20. The filter of claim 1 further comprising an optically clear, substantially uniform, conformable layer having a front surface and a back surface, wherein the front surface covers the microstructured second surface of the transparent layer.

21. The filter of claim 20 wherein the conformable layer has an average thickness from about 2.5 microns to about 270 microns.

22. The filter of claim 20 wherein the conformable layer comprises a polyvinylbutyral, a polyurethane or a polyester.

23. The filter of claim 20 wherein the back surface of the conformable layer has a textured finish.

24. A method of making a light transmitting filter comprising the steps of:
   (1) providing a transparent film having a first microstructured surface and second microstructured surface wherein the microstructures of the first surface form interstitial regions between the microstructures and wherein the microstructures of the first surface are optically aligned with the microstructures of the second surface;

(2) providing a layer of light absorbing material having a first and a second surface; and (3) embedding the microstructures of the first surface of the transparent film into the light absorbing material to a depth sufficient to form light passages through the light absorbing layer, wherein the interstitial regions between the microstructures are substantially filled with light absorbing material.

25. The method of claim 24 wherein the microstructures of the first surface have a height of up to about 250 microns.

26. The method of claim 24 wherein the microstructures of the first surface comprise cylinders, truncated cones or pyramids, rectangles, hemispheres, squares, hexagon, ridges, and or combinations of two or more thereof.

27. The method of claim 24 wherein the second surface of the transparent layer is covered with a Fresnel lens.

28. The method of claim 24 wherein the microstructures of the second surface have a height up to about 300 microns.

29. The method of claim 24 wherein the microstructures on the second surface have the same dimensions as the microstructures of the first surface.

30. The method of claim 24 wherein the microstructures of the second surface comprise hemispheres.

31. The method of claim 24 further comprising adhering an optically clear support layer to the first surface of the light absorbing layer.

32. The method of claim 31 wherein the clear support layer comprises glass, or an optically clear polymeric film.

33. The method of claim 24 further comprising the step of applying a conformable coating to the microstructures of the second surface of the transparent layer.

* * * * *